United States Patent
Byun et al.

(10) Patent No.: US 9,660,249 B2
(45) Date of Patent: May 23, 2017

(54) RECHARGEABLE BATTERY HAVING A FUSE

(71) Applicant: SAMSUNG SDI CO., LTD., Yongin-si, Gyeonggi-do (KR)

(72) Inventors: Sang-Won Byun, Yongin-si (KR); Won-Jun Lee, Yongin-si (KR); Young-Sik Moon, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 248 days.

(21) Appl. No.: 14/260,230

(22) Filed: Apr. 23, 2014

(65) Prior Publication Data
US 2015/0093610 A1   Apr. 2, 2015

Related U.S. Application Data

(60) Provisional application No. 61/885,446, filed on Oct. 1, 2013.

(51) Int. Cl.
*H01M 2/34* (2006.01)
*H01H 85/02* (2006.01)

(52) U.S. Cl.
CPC ...... *H01M 2/348* (2013.01); *H01H 2085/025* (2013.01); *H01M 2200/103* (2013.01)

(58) Field of Classification Search
CPC .. H01M 2/348; H01M 2200/103; H01M 2/34; H01H 2085/025
See application file for complete search history.

(56) References Cited

U.S. PATENT DOCUMENTS

| 2011/0081560 A1* | 4/2011 | Kim | H01H 37/761 |
| | | | 429/7 |
| 2011/0305928 A1* | 12/2011 | Kim | H01M 10/0431 |
| | | | 429/61 |
| 2012/0214031 A1 | 8/2012 | Kim | |

FOREIGN PATENT DOCUMENTS

| EP | 2 306 485 A1 | 4/2011 |
| EP | 2 521 207 A2 | 11/2012 |
| EP | 2 533 326 A1 | 12/2012 |
| JP | 09-153355 | 6/1997 |

(Continued)

OTHER PUBLICATIONS

Gasket_definition by Merriam-Webster, Pertinent Page: p. 1.*

(Continued)

*Primary Examiner* — Jonathan G Leong
*Assistant Examiner* — Seenam Agbetiafan
(74) *Attorney, Agent, or Firm* — Lewis Roca Rothgerber Christie LLP (57) ABSTRACT

A rechargeable battery includes an electrode assembly; a case housing the electrode assembly; and an electrode connection assembly electrically coupled to the electrode assembly, the electrode connection assembly including: a terminal; a current collector electrically coupled to the electrode assembly; an insulating member between the terminal and the current collector, wherein a portion of the insulating member is spaced from the terminal and the current collector; and a connection member electrically coupling the terminal and the current collector, the connection member including a fuse part, wherein the portion of the insulating member overlaps with the connection member.

17 Claims, 9 Drawing Sheets

(56) References Cited

FOREIGN PATENT DOCUMENTS

JP        10-275545       10/1998
KR      1998-034205     8/1998

OTHER PUBLICATIONS

EPO Search Report dated Feb. 2, 2015, for corresponding European Patent application 14187237.4, (8 pages).
Patent Abstracts of Japan, and English machine translation of Japanese Publication 09-153355 dated Jun. 10, 1997, listed above, (7 pages).
Korean Patent Abstracts, Publication No. 100200753B1, dated Jun. 15, 1999, for corresponding Korean Patent 1998-034205.
EPO Office action dated May 10, 2016, for corresponding European Patent application 14187237.4, (6 pages).

* cited by examiner

RECHARGEABLE BATTERY HAVING A FUSE

CROSS-REFERENCE TO RELATED APPLICATION

This application claims priority to and the benefit of U.S. Provisional Application No. 61/885,446, filed on Oct. 1, 2013 in the U.S. Patent and Trademark Office, the entire content of which is incorporated herein by reference.

BACKGROUND

1. Field

The described technology relates generally to a rechargeable battery.

2. Description of the Related Art

A rechargeable battery is a battery that can discharged and recharged, unlike a primary battery that cannot be recharged. A low-capacity rechargeable battery has been used for a small electronic device that can be carried, like a mobile phone, a laptop computer, and a camcorder, and a large-capacity battery has been used as a power supply for driving a motor such as for a hybrid vehicle and the like, or a large-capacity power storage device.

In recent years, a high-output rechargeable battery using a non-aqueous electrolytic solution having high energy density has been developed. The high-output rechargeable battery is configured as a large-capacity battery module by connecting a plurality of rechargeable batteries in series to be able to be used to drive a motor of a device requiring high power, for example, an electric car and the like. The rechargeable battery may be formed as a cylinder, a square, and the like.

When the rechargeable battery is charged or discharged, if a current of more than a normal value is charged or discharged, explosion or ignition of the rechargeable battery may be generated.

Here, damage to the rechargeable battery by the abnormal current may be prevented by a fuse installed between the electrode and the terminal.

That is, the fuse installed between the electrode and the terminal is disconnected when the abnormal current is generated.

When flow of the current between the electrode and the terminal is disconnected, the rechargeable battery enters a floating (neutral) state thereby preventing damage to the rechargeable battery.

However, the electrode of the rechargeable battery may be damaged by an arc or heat generated when the fuse is broken by the abnormal current.

Also, if the fuse contacts other elements of the rechargeable battery, when the abnormal current passes the fuse, an abnormal operation in which the fuse is broken at a temperature that is higher or lower than a predetermined temperature for the fuse to be broken may be generated.

The above information disclosed in this Background section is only for enhancement of understanding of the background of the described technology and therefore it may contain information that does not form the prior art that is already known in this country to a person of ordinary skill in the art.

SUMMARY

Accordingly, the present invention provides a rechargeable battery in which damage inside the rechargeable battery by breaking of a fuse and abnormal operation of the fuse is prevented.

A rechargeable battery according to an exemplary embodiment includes an electrode assembly; a case housing the electrode assembly; and an electrode connection assembly electrically coupled to the electrode assembly, the electrode connection assembly including a terminal; a current collector electrically coupled to the electrode assembly; an insulating member between the terminal and the current collector, wherein a portion of the insulating member is spaced from the terminal and the current collector; and a connection member electrically coupling the terminal and the current collector, the connection member having a fuse part, wherein the portion of the insulating member overlaps with the connection member.

In various embodiments, the fuse part further includes a fuse opening, the insulating member includes a supporting protrusion within the fuse opening, and the connection member is directly coupled to the terminal and to the current collector. In one embodiment, the connection member further includes an insulating layer coupled to the fuse part. The insulating member may have a first insulating portion directly contacting the terminal and a second insulating portion spaced from the terminal, wherein the second insulating portion overlaps with the connection member.

In one embodiment, the connection member further includes a first coupling part and a second coupling part, wherein the fuse part is between the first and second coupling part. Further, the connection member may include a first flange part extending at an angle from the first portion and abutting the terminal and a second flange part extending at an angle from the second portion and abutting the current collector. The insulating member may be between the first coupling part and the second coupling part.

In one embodiment, the first coupling portion and the second coupling portion of the connection member each have a coupling hole and the insulating member may have an opening aligned with each coupling hole of the connection member.

In one embodiment, the terminal has a terminal flange and a connection protrusion protruding from the terminal flange, wherein the connection protrusion extends through each coupling hole of the connection member and through the opening of the insulating member. The connection member may directly contact the terminal flange and the current collector. Further, the insulating member may have an insulating protrusion and wherein the connection protrusion extends into the insulating protrusion. The insulating protrusion and the connection protrusion may extend into a terminal opening in the current collector.

In various embodiments, the connection member is within the case, the terminal, the current collector, the insulating member, and the connection member are molded together, the insulating member insulates the terminal from the current collector and the connection member is directly coupled to the terminal and the current collector.

According to an exemplary embodiment, the electrode of the rechargeable battery may be prevented from being damaged by the arc or the heat generated when the fuse is broken by the abnormal current.

Also, according to an exemplary embodiment, the abnormal operation in which the fuse is broken at a temperature lower or higher a temperature that is predetermined for the fuse to be broken when the abnormal current passes through the fuse is prevented.

DETAILED DESCRIPTION

Hereinafter, exemplary embodiments of the present invention will be described in detail with reference to the accompanying drawings so that those skilled in the art to which the present invention pertains can realize the present invention. As those skilled in the art would realize, the described embodiments may be modified in various different ways, all without departing from the spirit or scope of the present invention.

Figure 1:
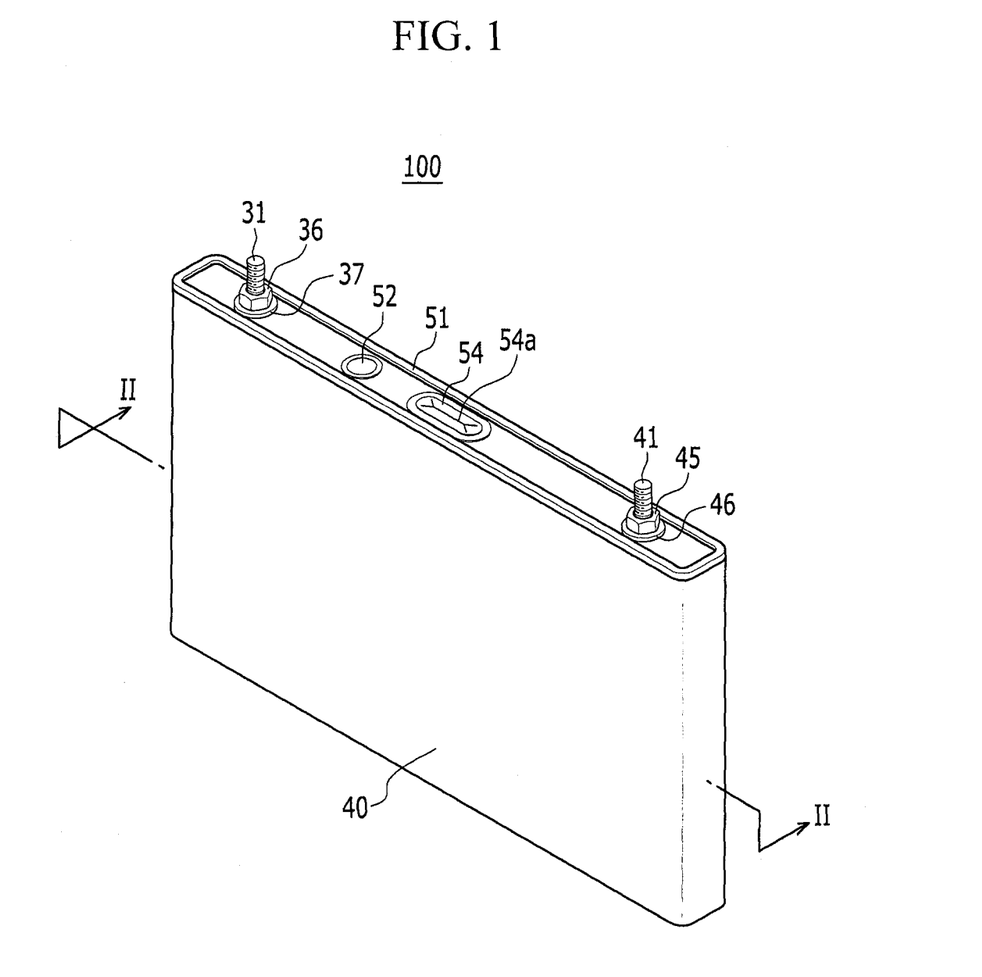
FIG. 1 is a perspective view of a rechargeable battery according to a first exemplary embodiment of the present invention.
Figure 2:
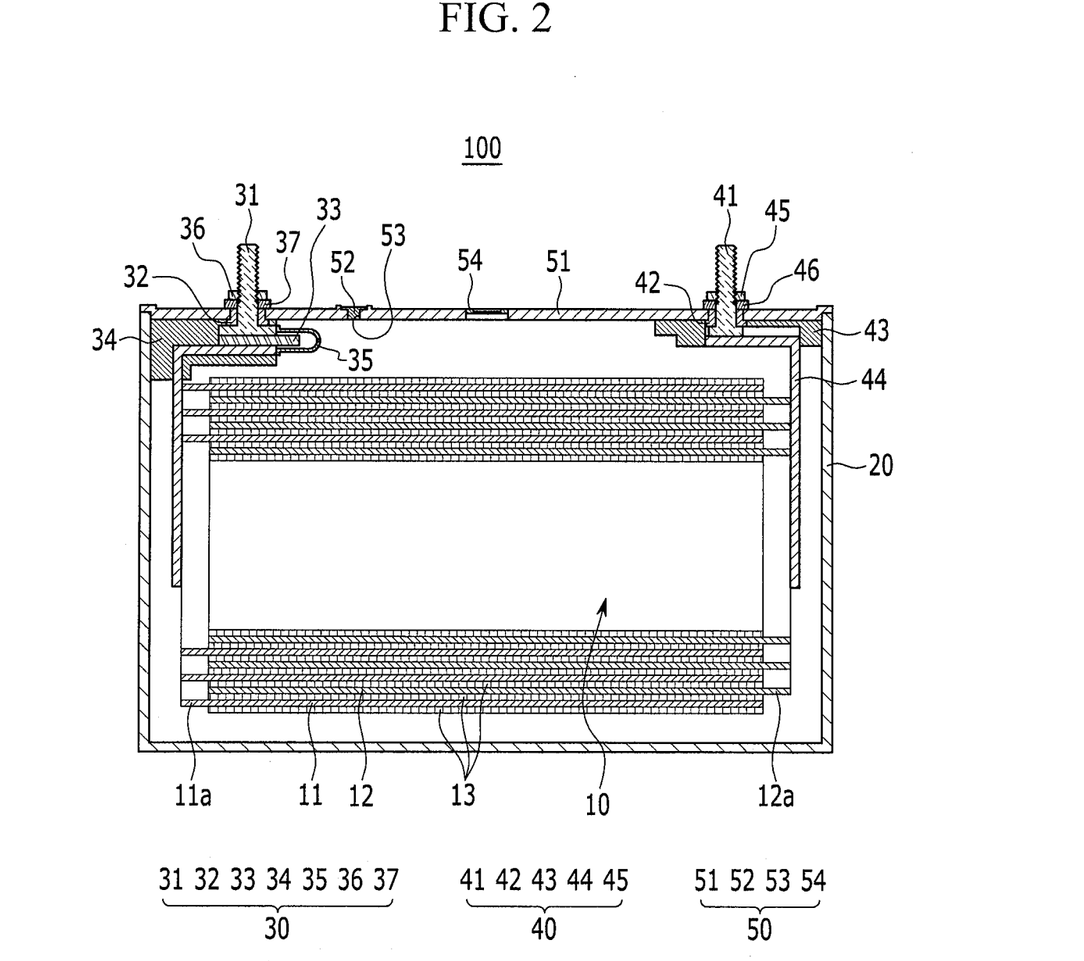
FIG. 2 is a cross-sectional view taken along the line II-II of FIG. 1.

FIG. 1 is a perspective view of a rechargeable battery according to a first exemplary embodiment of the present invention, and FIG. 2 is a cross-sectional view taken along the line II-II of FIG. 1.

Referring to FIG. 1 and FIG. 2, a rechargeable battery 100 according to a first exemplary embodiment of the present invention includes an electrode assembly 10, a case 20 that houses the electrode assembly 10, a first electrode connection part 30 and a second electrode connection part 40 electrically connected to the electrode assembly 10, and a cap assembly 50 that covers an opening of the case 20.

The rechargeable battery 100 according to the present exemplary embodiment is a lithium ion rechargeable battery and has a quadrangular shape. However, the present invention is not limited thereto, and the present invention can be applied to various forms of batteries such as a lithium polymer battery or a cylindrical battery.

The electrode assembly 10 according to the present exemplary embodiment is formed with a jelly roll shape by together spiral-winding a first electrode 11, a second electrode 12, and a separator 13.

Here, according to the present exemplary embodiment, the first electrode 11 is a negative electrode and the second electrode 12 is a positive electrode. However, the present exemplary embodiment is not limited thereto, and the first electrode 11 may be the positive electrode and the second electrode may be the negative electrode 12.

The first electrode 11 and the second electrode 12 include a coated region formed by coating an active material on the electrode, and a first electrode uncoated region 11a and a second electrode uncoated region 12a having no coated active material on the electrode and located at respective sides of the coated region in the jelly roll shape.

The first electrode connection part 30 is electrically connected to the first electrode uncoated region 11a of the electrode assembly 10, and the second electrode connection part 40 is electrically connected to the second electrode uncoated region 12a.

The first electrode connection part 30 according to the present exemplary embodiment may include a first terminal 31, a first gasket 32, an insulating member 33, a first current collector 34, a connection member 35, a first terminal plate 36 coupled to the first terminal 31 on the cap plate 51, and a first assistance plate 37 installed between the first terminal plate 36 and the cap plate 51.

Here, the first gasket 32 is installed between the first terminal 31 and the cap plate 51 to insulate the first terminal 31 and the cap plate 51, and prevents an electrolyte solution inside the case 20 from leaking outside the case 20.

The first current collector 34 is electrically connected to the first electrode uncoated region 11a, and the first electrode 11 is electrically connected to the first terminal 31 via the first current collector 34.

The second electrode connection part 40 according to the present exemplary embodiment may include a second terminal 41, a second gasket 42, a second lower insulating member 43, a second current collector 44, a second terminal plate 45 coupled to the second terminal 41 on the cap plate 51, and a second assistance plate 46 installed between the second terminal plate 45 and the cap plate 51.

The second gasket 42 is installed between the second terminal 41 and the cap plate 51 to insulate the second terminal 41 and the cap plate 51, and prevents the electrolyte solution inside the case 20 from leaking outside the case 20.

The second current collector 44 is electrically connected to the second electrode uncoated region 12a, and the second electrode 12 is electrically connected to the second terminal 41 via the second current collector 44.

The second assistance plate 46 according to the present exemplary embodiment may be formed of an insulating material or a conductive material.

If the second assistance plate 46 according to the present exemplary embodiment is formed of the conductive material, the cap plate 51 and the case 20 are electrically connected to the second electrode 12 via the second assistance plate 46.

The cap assembly 50 according to the present exemplary embodiment includes a cap plate 51, an electrolyte solution injection hole 53 formed with a sealing valve 52, and a vent part 54.

The cap plate 51 is formed of the conductive material in a thin plate shape and is coupled to the opening of the case 20.

The cap plate 51 includes the electrolyte solution injection opening 53 for injecting the electrolyte solution inside the closed and sealed case 20, and the electrolyte solution injection opening 53 is sealed by the sealing valve 52 after injecting the electrolyte solution and is installed with the first terminal 31 and the second terminal 41.

Figure 3:
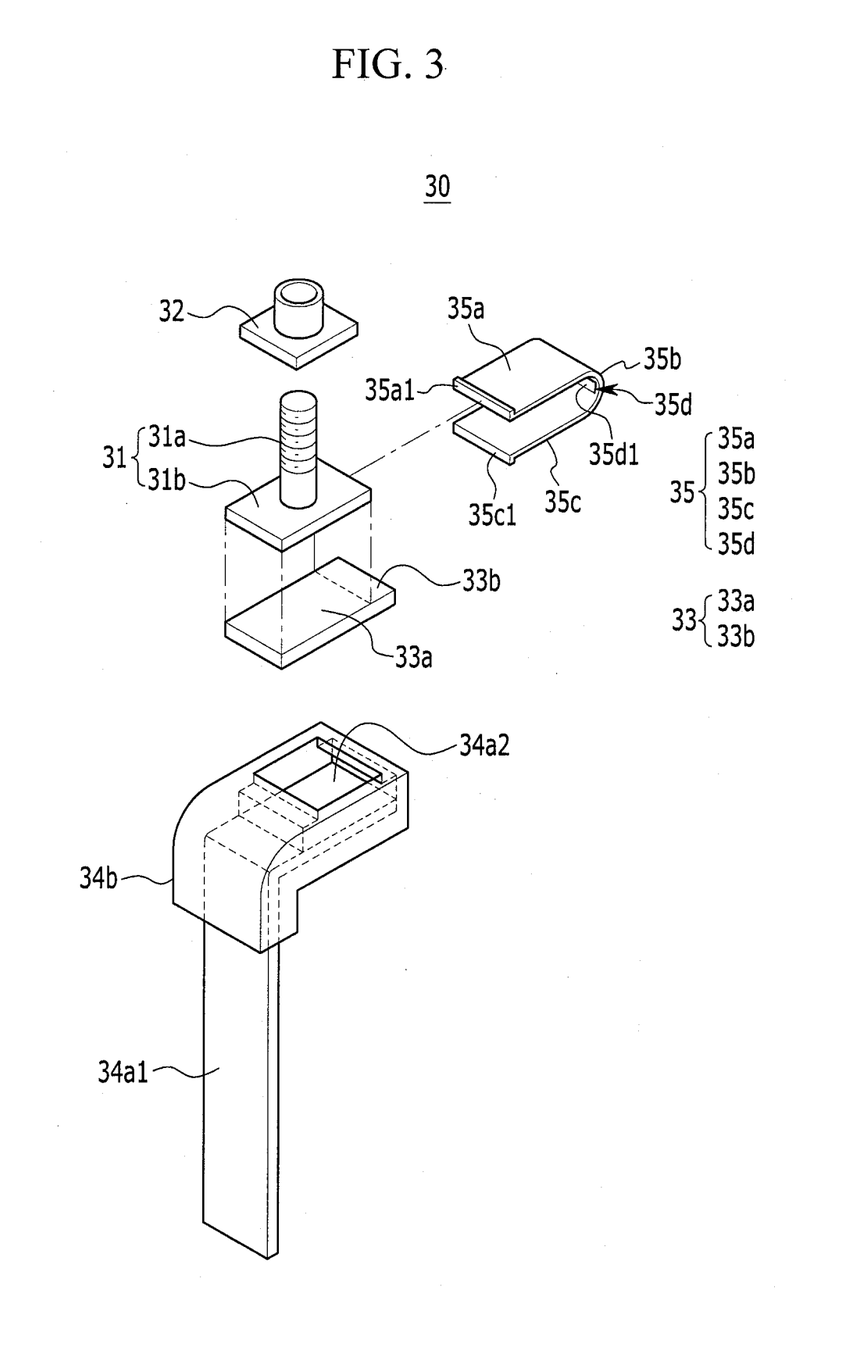
FIG. 3 is an exploded perspective view of a first electrode connection part according to a first exemplary embodiment of the present invention.
Figure 4:
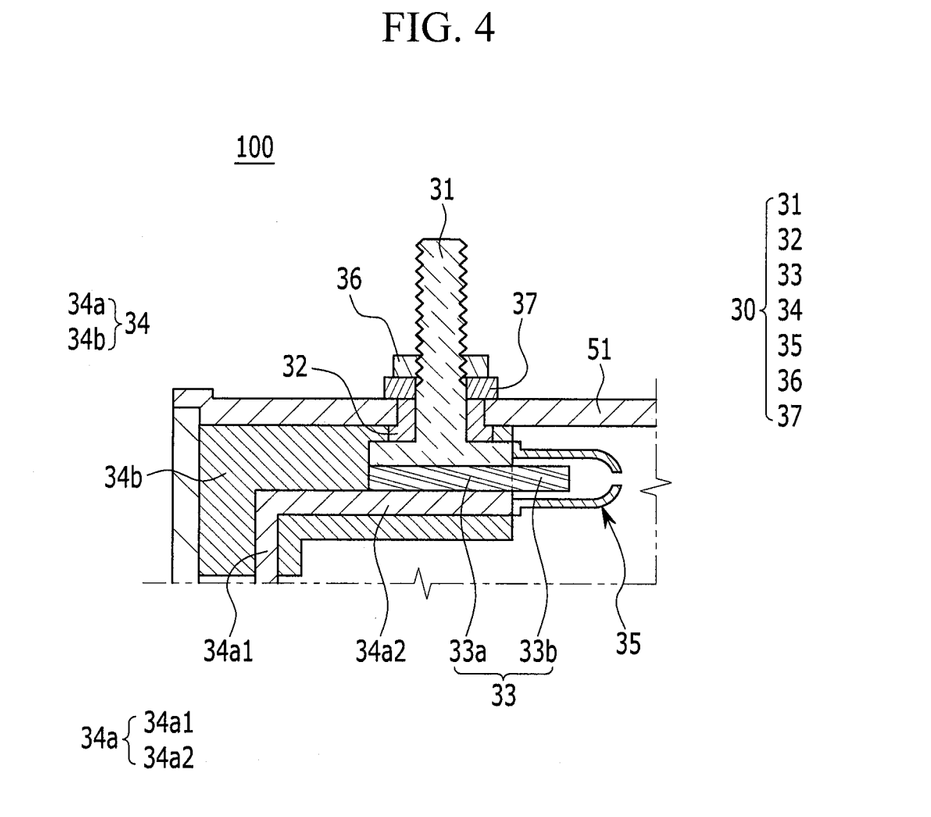
FIG. 4 is a cross-sectional view of a portion in which the first electrode connection part of the rechargeable battery of FIG. 3 is installed.

FIG. 3 is an exploded perspective view of a first electrode connection part according to a first exemplary embodiment of the present invention, and FIG. 4 is a cross-sectional view of a portion in which the first electrode connection part of the rechargeable battery of FIG. 3 is installed.

Referring to FIG. 3 and FIG. 4, the first terminal 31 according to the present exemplary embodiment includes a terminal pillar 31a and a terminal flange 31b.

The first gasket 32 is coupled to the terminal pillar 31a and the terminal flange 31b and is installed between the first terminal 31 and the cap plate 51.

The insulating member 33 according to the present exemplary embodiment is installed between the first terminal 31 and the first current collector 34, and may be formed of perfluoroalkoxy (PFA).

In detail, the first current collector 34 according to the present exemplary embodiment includes an electrode current collecting part 34a and a molding part 34b.

The electrode current collecting part 34a includes a first electrode current collecting part 34a1 connected to the first electrode 11 and a second electrode current collecting part 34a2 electrically connected to the first terminal 31.

The insulating member 33 and the first terminal 31 are sequentially installed to the second electrode current collecting part 34a2 according to the present exemplary embodiment.

The molding part 34b according to the present exemplary embodiment may be formed by insert-molding the portion of the first electrode current collecting part 34a1, the second electrode current collecting part 34a2, the insulating member 33, and the first terminal 31.

The molding material of the molding part 34b may include polyphenylene sulfide (PPS).

According to the present exemplary embodiment, the first terminal 31, the insulating member 33, and the first current collector 34 may be integrally formed by the molding such that the first electrode connection part 30 may be installed to the rechargeable battery 100 by a simple process.

Also, according to the present exemplary embodiment, another configuration may be installed between the electrode assembly 10 and the cap plate 51 in addition to the molding part 34b such that a space may be sufficiently obtained between the electrode assembly 10 and the first current collector 34.

Accordingly, even if an external impact is applied to the rechargeable battery 100 such that the electrode assembly 10 is moved, the electrode assembly 10 may be prevented from being damaged by other configurations installed to the molding part 34b between the cap plate 51.

One surface of the molding part 34b facing the electrode assembly 10 may function as an insulator between the cap plate 51 and the electrode assembly 10.

The connection member 35 according to the present exemplary embodiment may be formed of a thin plate material made of a conductive material such as aluminum.

The connection member 35 includes a first coupling part 35a, a second coupling part 35c, a connection part 35b connecting the first coupling part 35a and the second coupling part 35c, and a fuse part 35d.

The first coupling part 35a may include a first flange part 35a1 extending from one end of the first coupling part 35a, and the second coupling part 35c may include a second flange part 35c1 extending from one end of the second coupling part 35c.

The first flange part 35a1 of the first coupling part 35a may be welding-coupled to the terminal flange 31b of the first terminal 31, and the second flange part 35c1 of the second coupling part 35c may be welding-coupled to the second electrode current collecting part 34a2 of the first current collector 34.

The insulating member 33 of the present exemplary embodiment may be installed for the first portion 33a of the insulating member 33 to be positioned between the first terminal 31 and the first current collector 34 and for the second portion 33b protruded from the first portion 33a to be positioned between the first coupling part 35a and the second coupling part 35c.

The connection member 35 according to the present exemplary embodiment is welding-coupled to one end of the second electrode current collecting part 34a2 in which the molding part 34b is not formed such that the connection member 35 may be positioned between the coating region where the active material of the electrode assembly 10 is coated and the cap plate 51.

The connection member 35 is coupled to the first terminal 31 and the first current collector 34 to electrically connect the first terminal 31 and the first current collector 34.

The fuse part 35d according to the present exemplary embodiment may be formed at the connection part 35b.

However, the fuse part 35d according to the present exemplary embodiment is not limited to only being formed at the connection part 35b, but rather it may be formed at one of the connection part 35b, the first coupling part 35a, and the second coupling part 35c, among other places.

The fuse part 35d may include a fuse hole 35d1 passing through the portion of the connection part 35b.

If an abnormal current of a high voltage is generated in the rechargeable battery 100 such that the current of the high voltage flows between the first terminal 31 and the first electrode current collecting part 34, the fuse part 35d is fractured such that the rechargeable battery 100 enters a neutral state.

According to the present exemplary embodiment, an arc or heat generated when the fuse part 35d of the connection member 35 is fractured is absorbed to the second portion 33b of the insulating member 33 positioned between the first coupling part 35a and the second coupling part 35c such that the damage to the electrode of the rechargeable battery 100 may be prevented by the fracturing of the fuse part 35d.

Furthermore, according to the present exemplary embodiment, the connection member 35 is positioned between the coating region coated with the active material of the electrode assembly 10 and the cap plate 51 such that the damage to the first electrode uncoated region 11a may be prevented by the arc or the heat generated when the fuse part 35d of the connection member 35 is fractured.

The fuse part 35d according to the present exemplary embodiment is positioned to be spatially separated from the configurations such as the molding part 34b or the first terminal 31.

Accordingly, according to the present exemplary embodiment, the abnormal operation of the fuse part 35d that is fractured at a temperature that is higher or lower than a temperature that the fuse part 35d is predetermined to be fractured by the interference of the other configurations may be prevented.

Figure 5:
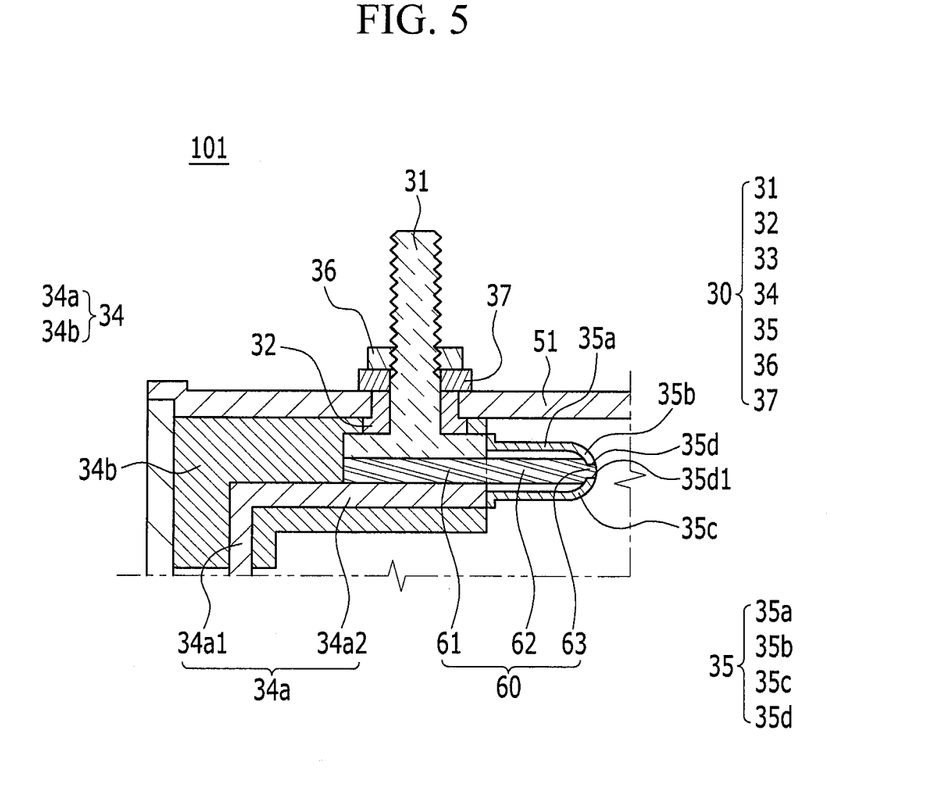
FIG. 5 is a cross-sectional view of a portion in which the first electrode connection part of the rechargeable battery according to an exemplary variation of a first exemplary embodiment of the present invention is installed.

FIG. 5 is a cross-sectional view of a portion of the first electrode connection part of the rechargeable battery according to an exemplary variation of the first exemplary embodiment of the present invention.

Referring to FIG. 5, the rechargeable battery 101 according to the present exemplary embodiment is the same as the rechargeable battery 100 according to the first exemplary embodiment of the present invention except for an insulating member 60.

Accordingly, the detailed description of the same configurations and technical effects as the rechargeable battery 100 according to the first exemplary embodiment of the present invention is omitted.

The insulating member 60 according to the present exemplary embodiment is installed between the first terminal 31 and the first current collector 34, and may be formed of perfluoroalkoxy (PFA).

The insulating member 60 according to the present exemplary embodiment includes a first portion 61, a second portion 62, and a supporting protrusion 63.

The first portion 61 of the insulating member 33 according to the present exemplary embodiment is positioned between the first terminal 31 and the first current collector 34, and the second portion 62 protruded from the first portion 61 is installed to be positioned between the first coupling part 35a and the second coupling part 35c of the connection member 35.

In the insulating member 60 according to the present exemplary embodiment, the supporting protrusion 63 protruded from the second portion 62 is inserted into the fuse hole 35d1 of the fuse part 35d formed at the connection part 35b of the connection member 35.

If the abnormal current of the high voltage is generated in the rechargeable battery 101 such that the current of the high voltage flows between the first terminal 31 and the first electrode current collecting part 34, the fuse part 35d is fractured such that the rechargeable battery 101 enters the neutral state.

According to the present exemplary embodiment, the supporting protrusion 63 of the insulating member 60 inserted into the fuse hole 35d1 of the fuse part 35d absorbs the arc or the heat generated between the broken surfaces after the fuse part 35d is fractured such that the damage to the rechargeable battery 101 by the arc or the heat generated by the fracturing of the fuse part 35d may be prevented.

According to the present exemplary embodiment, the fractured surfaces of the fuse part 35d are maintained in the separated state by the supporting protrusion 63 such that the short circuited state inside the rechargeable battery 101 by the abnormal current may be stably maintained.

Figure 6:
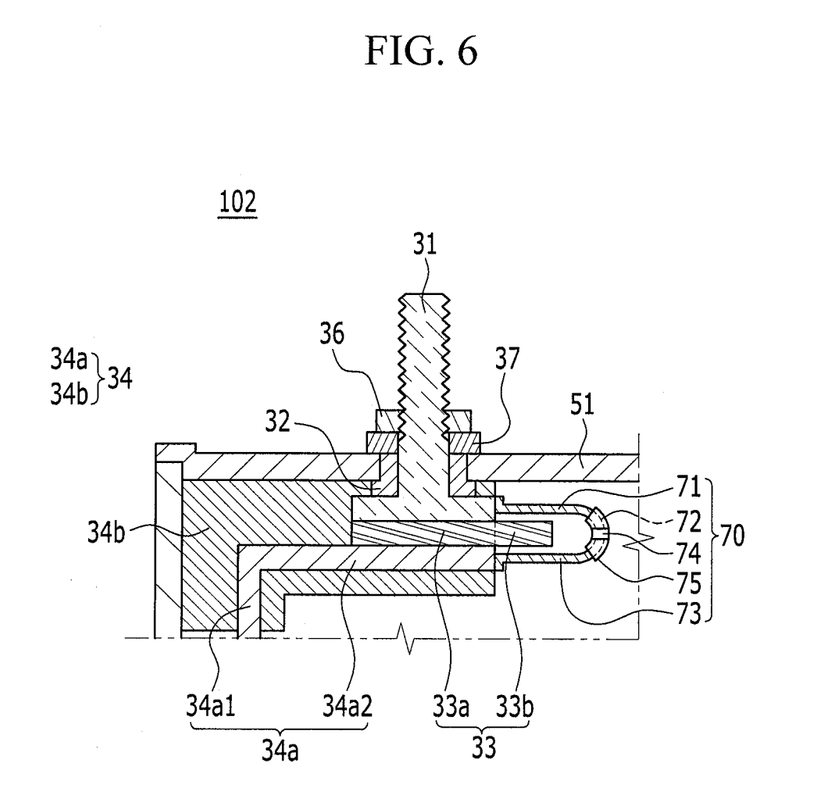
FIG. 6 is a cross-sectional view of a portion in which the first electrode connection part of the rechargeable battery according to another exemplary variation of a first exemplary embodiment of the present invention is installed.

FIG. 6 is a cross-sectional view of a portion in which the first electrode connection part of the rechargeable battery according to another exemplary variation of a first exemplary embodiment of the present invention is installed.

Referring to FIG. 6, a rechargeable battery 102 according to the present exemplary embodiment is the same as the rechargeable battery 100 according to the first exemplary embodiment of the present invention except for a connection member 70.

Accordingly, the detailed description for the same configurations and technical effects as the rechargeable battery 100 according to the first exemplary embodiment of the present invention is omitted.

The connection member 70 according to the present exemplary embodiment may be formed of the thin plate material made of the conductive material such as aluminum.

The connection member 70 includes a first coupling part 71, a second coupling part 73, a connection part 72 connecting the first coupling part 71 and the second coupling part 73, a fuse part 74 formed at the connection part 72, and an insulating layer 75 coupled to the fuse part 74.

The first coupling part 71, the connection part 72, the second coupling part 73, and the fuse part 74 according to the present exemplary embodiment have the same structure as the first coupling part 35a, the connection part 35b, the second coupling part 35c, and the fuse part 35d of the connection member 35 according to the first exemplary embodiment of the present invention.

Accordingly, the detailed description of the first coupling part 71, the connection part 72, the second coupling part 73, and the fuse part 74 is omitted.

The insulating layer 75 according to the present exemplary embodiment is formed of an insulating material such as perfluoroalkoxy (PFA), and may be formed by molding the insulating material to the fuse part 74.

However, the insulating layer 75 according to the present exemplary embodiment is not limited to the molding to the fuse part 74, and the insulating layer 75 according to the present exemplary embodiment may be formed by adhering an insulating film of a sheet shape to the fuse part 74.

If the abnormal current of a high voltage is generated in the rechargeable battery 102 such that the current of the high voltage flows between the first terminal 31 and the first electrode current collecting part 34, the fuse part 35d is fractured such that the rechargeable battery 102 enters the neutral state.

According to the present exemplary embodiment, the arc or the heat generated when the fuse part 74 of the connection member 70 is absorbed by the insulating layer 75 covering the fuse part 74 of the connection member 70, and the arc or the heat is prevented from being moved outside the insulating layer 75 such that the electrode of the rechargeable battery 102 may be prevented from being damaged.

Figure 7:
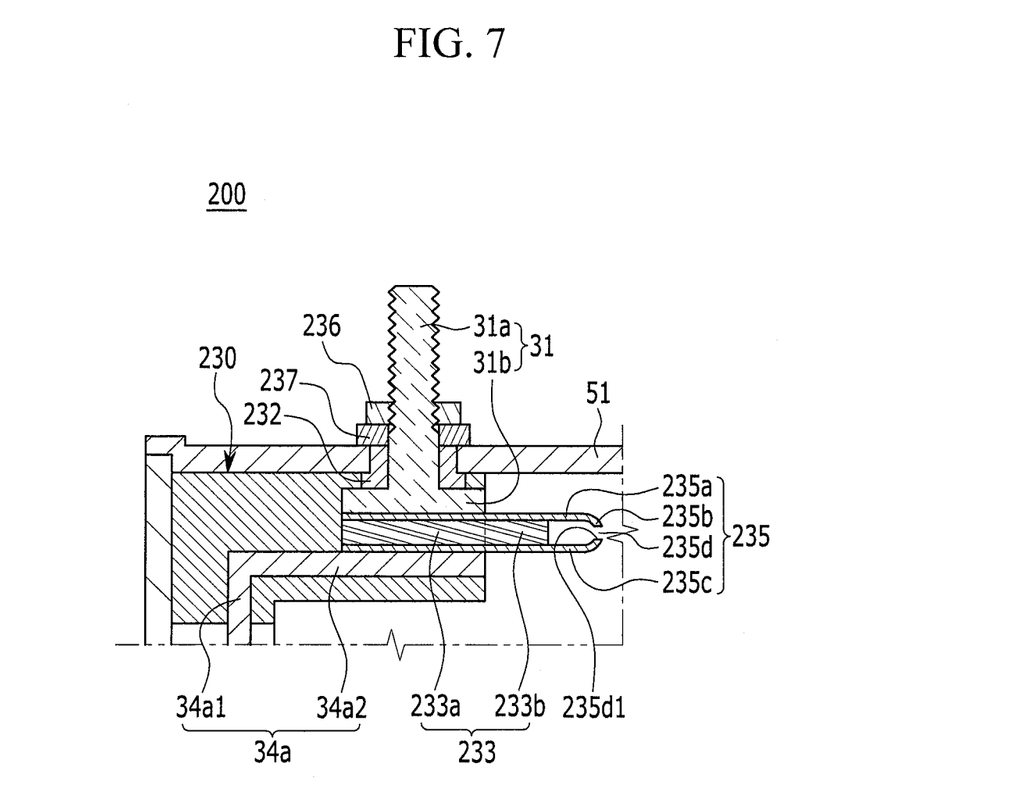
FIG. 7 is a cross-sectional view of a portion in which the first electrode connection part of the rechargeable battery according to a second exemplary embodiment of the present invention is installed.

FIG. 7 is a cross-sectional view of a portion in which the first electrode connection part of the rechargeable battery according to a second exemplary embodiment of the present invention is installed.

Referring to FIG. 7, the rechargeable battery 200 according to the present exemplary embodiment has the same structure as the rechargeable battery 100 according to the first exemplary embodiment of the present invention except for a connection member 235 of a first electrode connection part 230.

Accordingly, the detailed description of the same configurations and technical effects as the rechargeable battery 100 according to the first exemplary embodiment of the present invention is omitted.

The connection member 235 according to the present exemplary embodiment includes a first coupling part 235a, a second coupling part 235c, a connection part 235b connecting the first coupling part 235a and the second coupling part 235c, and a fuse part 235d formed at the connection part 235b. Further, an insulating member 233 includes a first portion 233a and a second portion 233b.

The first coupling part 235a according to the present exemplary embodiment is installed between the first portion 233a of the insulating member 233 and the terminal flange 31b extended from the terminal pillar 31a of the first terminal 31, and is respectively coupled to the first portion 233a of the insulating member 233 and the terminal flange 31b by welding.

The second coupling part 235c according to the present exemplary embodiment is installed between the first portion 233a of the insulating member 233 and the second electrode current collecting part 34a2 of the electrode current collecting part 34a, and is respectively coupled to the first portion 233a of the insulating member 233 and the second electrode current collecting part 34a2 by welding.

Accordingly, according to the present exemplary embodiment, the first coupling part 235a and the second coupling part 235c are installed between the first terminal 31 and the electrode current collecting part 34a such that the connection member 235 may be stably fixed to the electrode current collecting part 34a.

Also, according to the present exemplary embodiment, the first terminal 31, the insulating member 233, the first current collector 34, and the connection member 235 may be integrally formed by molding.

According to the present exemplary embodiment, the first electrode connection part 230 may be installed to the rechargeable battery 200 by a simple process.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For example, the present exemplary embodiment may protrude a supporting protrusion from one end of the second portion 233b of the insulating member 233 to be inserted into a fuse hole 235d1 of the fuse part 235d, and the fuse part 235d may be enclosed by an insulating layer.

Figure 8:
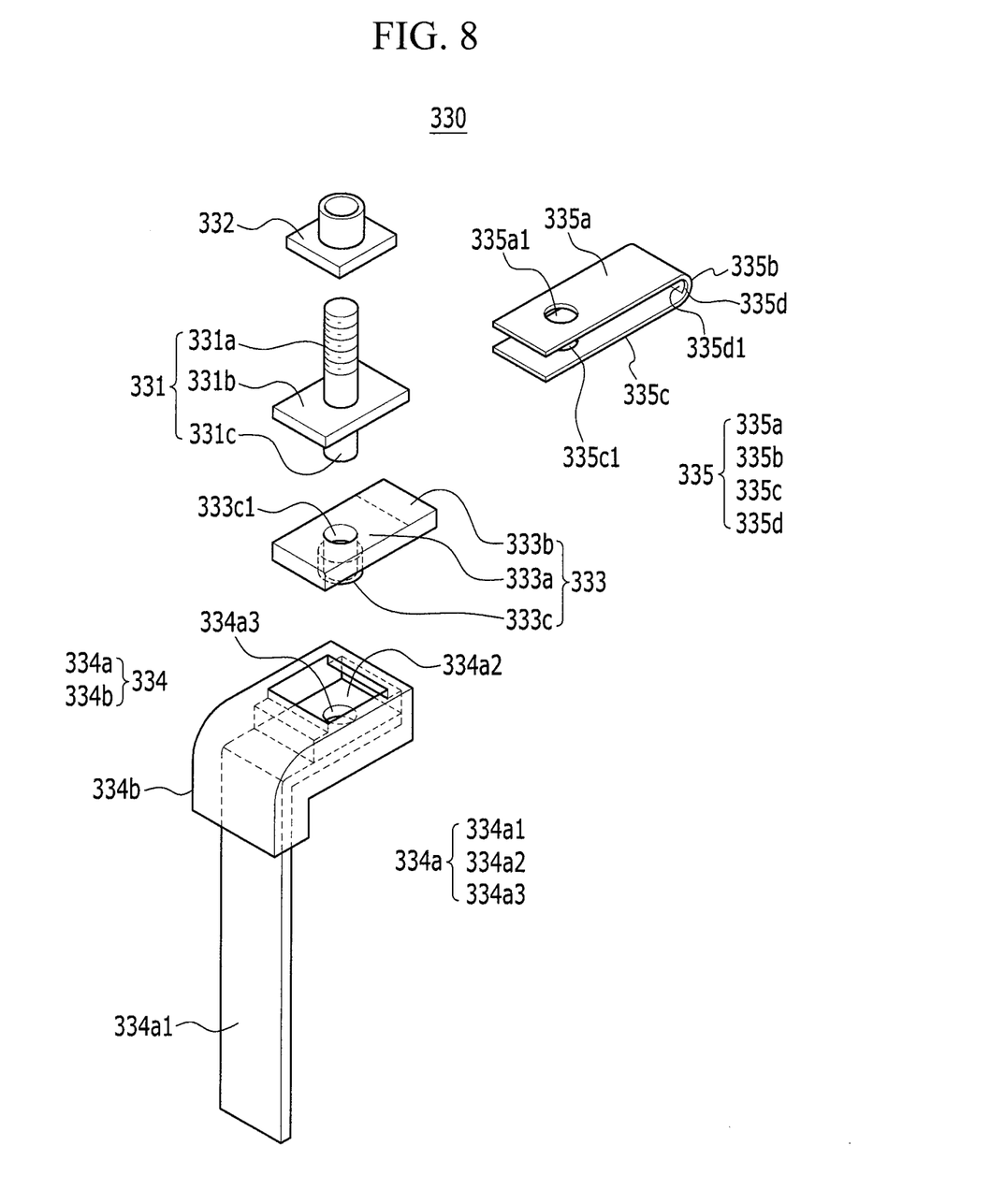
FIG. 8 is an exploded perspective view of a first electrode connection part according to a third exemplary embodiment of the present invention.
Figure 9:
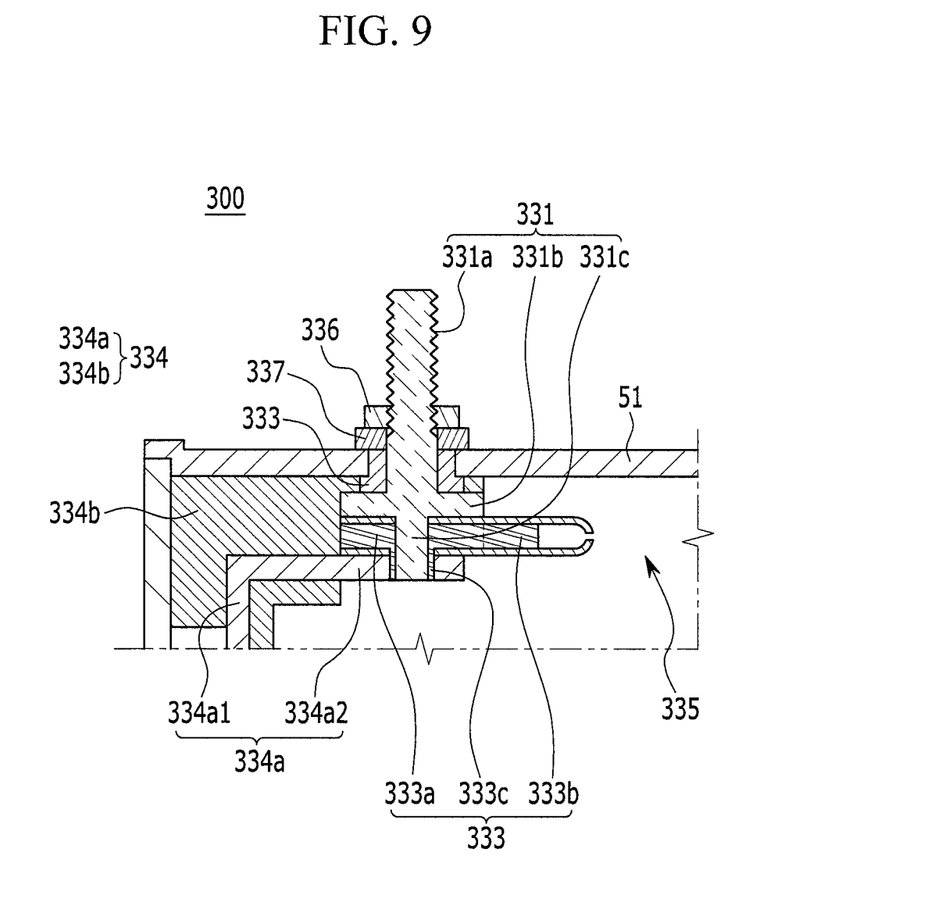
FIG. 9 is a cross-sectional view of a portion in which the first electrode connection part of the rechargeable battery of FIG. 8 is installed.

FIG. 8 is an exploded perspective view of a first electrode connection part according to a third exemplary embodiment of the present invention, and FIG. 9 is a cross-sectional view of a portion in which the first electrode connection part of the rechargeable battery of FIG. 8 is installed.

Referring to FIG. 8 and FIG. 9, the rechargeable battery 300 according to the present exemplary embodiment has the same constitutions as the rechargeable battery 100 according to the first exemplary embodiment of the present invention except for a first electrode connection part 330.

Accordingly, the detailed description for the same configurations as the rechargeable battery 100 according to the first exemplary embodiment of the present invention is omitted.

The first electrode connection part 330 according to the present exemplary embodiment may include a first terminal 331, a first gasket 332, an insulating member 333, a first current collector 334, a connection member 335, a first terminal plate 336 coupled to the first terminal 331 on the cap plate 51, and a first assistance plate 337 installed between the first terminal plate 336 and the cap plate 51.

The first gasket 332 is installed between the first terminal 331 and the cap plate 51 to insulate the first terminal 331 and the cap plate 51, and the first gasket 332 prevents an electrolyte solution inside the case 20 from leaking outside the case 20.

Also, the first current collector 334 is electrically connected to the first electrode uncoated region 11a, and the first electrode 11 is electrically connected to the first terminal 31 via the first current collector 334.

The first terminal 331 according to the present exemplary embodiment includes a terminal pillar 331a, a terminal flange 331b, and a connection protrusion 331c.

The first gasket 332 is coupled to the terminal pillar 331a and the terminal flange 331b to be installed between the first terminal 31 and the cap plate 51.

The insulating member 333 according to the present exemplary embodiment is installed between the first terminal 331 and the first current collector 334, and may be made of perfluoroalkoxy (PFA).

The insulating member 333 includes a first portion 333a, a second portion 333b protruded from the first portion 333a, and an insulating protrusion 333c formed at the first portion 333a and having a through-hole 333c1 passing through the first portion 333.

The first current collector 334 according to the present exemplary embodiment includes an electrode current collecting part 334a and a molding part 334b.

The electrode current collecting part 334a includes a first electrode current collecting part 334a1 connected to the first electrode 11, a second electrode current collecting part 334a2 electrically connected to the first terminal 31, and a terminal connection hole 334a3 formed at the second electrode current collecting part 334a2.

The connection member 335 according to the present exemplary embodiment may be formed of the thin plate material made of the conductive material such as aluminum.

The connection member 335 includes a first coupling part 335a, a second coupling part 335c, a connection part 335b connecting the first coupling part 335a and the second coupling part 335c, a fuse part 335d formed at the connection part 335b, a first coupling hole 335a1 formed at the first coupling part 335a, and a second coupling hole 335c1 formed at the second coupling part 335c.

However, the fuse part 335d according to the present exemplary embodiment is not limited to only being formed at the connection part 335b, and it may be formed at at least one of the connection part 335b, the first coupling part 335a, and the second coupling part 335c.

The second coupling part 335c of the connection member 335 according to the present exemplary embodiment is installed on the second electrode current collecting part 334a2 such that the second coupling hole 335c1 faces the terminal connection hole 334a3 formed in the second electrode current collecting part 334a2.

After the second coupling part 335c of the connection member 335 is installed at the second electrode current collecting part 334a2, the first portion 333a of the insulating member 333 is installed between the first coupling part 335a and the second coupling part 335c of the connection member 335 such that the insulating protrusion 333c formed at the first portion 333a is installed and fixed to the second coupling hole 335c1 and the terminal connection hole 334a3 and the through-hole 333c1 of the insulating protrusion 333c faces the first coupling hole 335a1.

The second portion 333b of the insulating member 333 is positioned between the first coupling part 335a and the second coupling part 335c of the connection member 335 that is not inserted between the first terminal 331 and the second electrode current collecting part 334a2.

After the first portion 333a of the insulating member 333 is installed between the first coupling part 335a and the second coupling part 335c of the connection member 335, the first terminal 331 is installed on the first coupling part 335a of the connection member 335 such that the connection protrusion 331c of the first terminal 331 passes through the first coupling hole 335a1 of the connection member 335, the through-hole 333c1 of the insulating protrusion 333c of the insulating member 333, the second coupling hole 335c1 of the connection member 335, and the terminal connection hole 334a3.

Accordingly, the electrode current collecting part 334a according to the present exemplary embodiment may be formed by sequentially depositing the first terminal 331, the insulating member 333, and the connection member 335 on the second electrode current collecting part 334a2.

Accordingly, according to the present exemplary embodiment, the first coupling part 335a and the second coupling part 335c are installed between the first terminal 331 and the electrode current collecting part 334a, and the connection protrusion 331c of the first terminal 331 is coupled to the first coupling part 335a and the second coupling part 335c of the connection member 335 such that the connection member 335 may be stably fixed to the electrode current collecting part 334a.

The molding part 334b according to the present exemplary embodiment may be formed by insert-molding the portion of the first electrode current collecting part 334a1, the portion of the second electrode current collecting part 334a2, the insulating member 333, and the first terminal 331.

The molding material of the molding part 334b may include polyphenylene sulfide (PPS).

According to the present exemplary embodiment, the first terminal 331, the insulating member 333, the first current collector 334, and the connection member 335 may be integrally made by molding such that the first electrode connection part 330 may be installed to the rechargeable battery 100 by a simple process.

Also, according to the present exemplary embodiment, the other components besides the molding part 34b are not installed between the electrode assembly 10 and the cap plate 51 such that sufficient space may be obtained between the electrode assembly 10 and the first electrode current collecting part 334.

Accordingly, even if an external impact is applied to the rechargeable battery 100 such that the electrode assembly 10 moves, the electrode assembly 10 may be prevented from being damaged by the other constitutions installed between the cap plate 51 and the molding part 334b.

Also, one surface of the molding part 334b facing the electrode assembly 10 may have a function of the insulator installed between the cap plate 51 and the electrode assembly 10.

The fuse part 335d according to the present exemplary embodiment may include a fuse hole 335d1 formed by passing through the portion of the connection part 335b.

If an abnormal current of a high voltage is generated in the rechargeable battery 300 such that the current of the high voltage flows between the first terminal 331 and the first electrode current collecting part 334, the fuse part 335d is fractured such that the rechargeable battery 300 enters the neutral state.

According to the present exemplary embodiment, an arc or heat generated when the fuse part 335d of the connection member 335 is fractured is absorbed to the second portion 333b of the insulating member 333 positioned between the first coupling part 335a and the second coupling part 335c such that the damage to the electrode of the rechargeable battery 100 may be prevented by the fracturing of the fuse part 335d.

Furthermore, according to the present exemplary embodiment, the connection member 335 is positioned between the coating region coated with the active material of the electrode assembly 10 and the cap plate 51 such that the damage to the first electrode uncoated region 11a by the arc or the heat generated when the fuse part 335d of the connection member 335 is fractured may be prevented.

Also, the fuse part 335d according to the present exemplary embodiment is positioned to be spatially separated from the configurations such as the molding part 34b or the first terminal 31.

Accordingly, according to the present exemplary embodiment, the abnormal operation of the fuse part 335d that is fractured at a temperature that is higher or lower than a temperature that the fuse part 335d is predetermined to be fractured by the interference of the other configurations may be prevented.

While this invention has been described in connection with what is presently considered to be practical exemplary embodiments, it is to be understood that the invention is not limited to the disclosed embodiments, but, on the contrary, is intended to cover various modifications and equivalent arrangements included within the spirit and scope of the appended claims.

For example, the present exemplary embodiment may form a supporting protrusion protruded from one end of the second portion 333b of the insulating member 333 to be inserted to the fuse hole 335d1 of the fuse part 335d, and the fuse part 335d may be enclosed by an insulating layer.

The invention claimed is:

1. A rechargeable battery comprising:
an electrode assembly;
a case housing the electrode assembly; and
an electrode connection assembly electrically coupled to the electrode assembly, the electrode connection assembly comprising:
a terminal;
a current collector electrically coupled to the electrode assembly;
an insulating member between and directly contacting the terminal and the current collector, wherein a portion of the insulating member protrudes away from the terminal and the current collector; and
a connection member electrically coupling the terminal and the current collector, the connection member comprising a fuse part, wherein the portion of the insulating member is entirely spaced from the connection member.

2. The rechargeable battery of claim 1, wherein the fuse part further comprises a fuse opening.

3. The rechargeable battery of claim 1, wherein the connection member is directly coupled to the terminal and to the current collector.

4. The rechargeable battery of claim 1, wherein the insulating member comprises a first insulating portion directly contacting the terminal and a second insulating portion spaced from the terminal.

5. The rechargeable battery of claim 4, wherein the second insulating portion overlaps with the connection member.

6. The rechargeable battery of claim 1, wherein the connection member further comprises a first coupling part and a second coupling part, wherein the fuse part is between the first and second coupling part.

7. The rechargeable battery of claim 6, wherein the connection member comprises a first curving part extending at an angle from the first coupling part and abutting the terminal and a second curving part extending at an angle from the second coupling part and abutting the current collector.

8. The rechargeable battery of claim 6, wherein the insulating member is between the first coupling part and the second coupling part.

9. The rechargeable battery of claim 6, wherein the first coupling part and the second coupling part of the connection member each have a coupling hole.

10. The rechargeable battery of claim 9, wherein the insulating member has an opening aligned with each coupling hole of the connection member.

11. The rechargeable battery of claim 10, wherein the terminal comprises a terminal flange and a connection protrusion protruding from the terminal flange, wherein the connection protrusion extends through each coupling hole of the connection member and through the opening of the insulating member.

12. The rechargeable battery of claim 11, wherein the connection member directly contacts the terminal flange and the current collector.

13. The rechargeable battery of claim 11, wherein the insulating member has an insulating protrusion and wherein the connection protrusion extends into the insulating protrusion.

14. The rechargeable battery of claim 13, wherein the insulating protrusion and the connection protrusion extend into a terminal opening in the current collector.

15. The rechargeable battery of claim 1, wherein the connection member is within the case.

16. The rechargeable battery of claim 1, wherein the terminal, the current collector, the insulating member, and the connection member are molded together.

17. The rechargeable battery of claim 1, wherein the insulating member insulates the terminal from the current collector.

* * * * *